No. 704,801. Patented July 15, 1902.
C. HILBERT.
ICE BREAKER.
(Application filed Feb. 24, 1902.)
(No Model.)
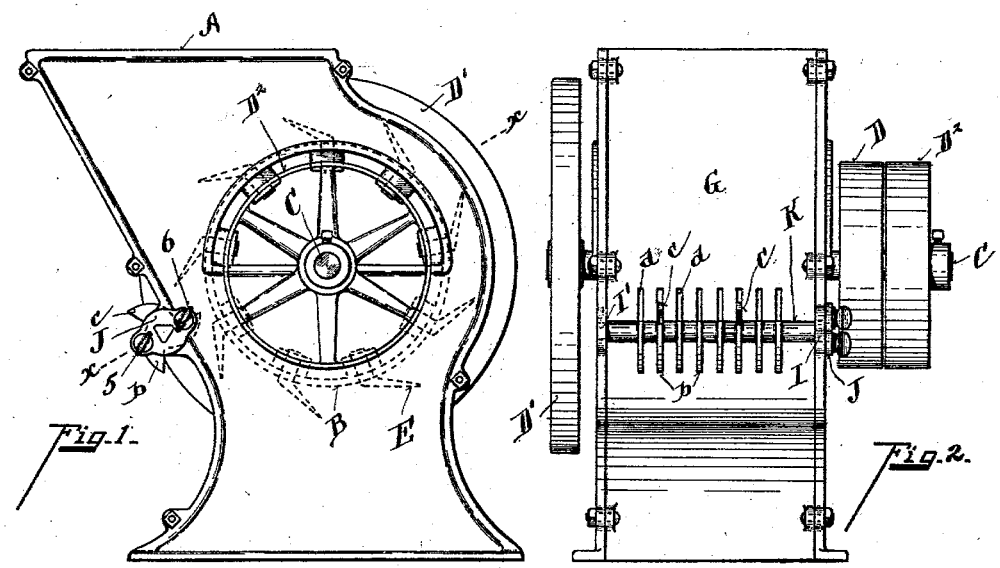
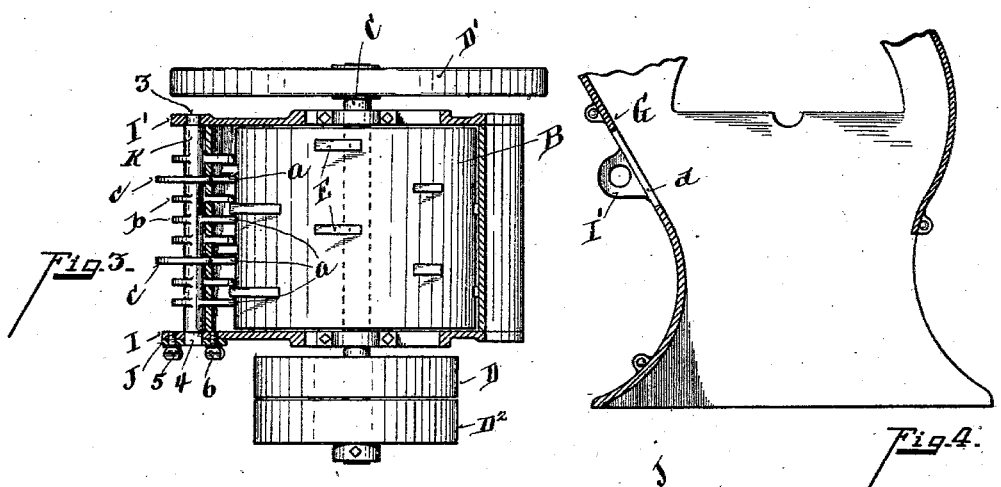

UNITED STATES PATENT OFFICE.

CHARLES HILBERT, OF CINCINNATI, OHIO.

ICE-BREAKER.

SPECIFICATION forming part of Letters Patent No. 704,801, dated July 15, 1902.

Application filed February 24, 1902. Serial No. 95,296. (No model.)

*To all whom it may concern:*

Be it known that I, CHARLES HILBERT, a citizen of the United States, residing at Cincinnati, in the county of Hamilton and State of Ohio, have invented certain new and useful Improvements in Ice-Breakers, of which the following is a specification.

My invention consists of a device for breaking up ice into pieces to be used for ice-cream freezers, soda-fountains, and other such use.

The object of my invention is to provide a device which will reduce a quantity of ice to any one of several predetermined sized pieces, such as the nut-shaped pieces to be used in ice-cream freezers and other analogous uses. As shown, I have provided my device with means for reducing the ice to any one of three different-sized pieces.

The features of my invention will be more fully set forth in the description of the accompanying drawings, forming a part of this specification, in which—

Figure 1 is a side elevation of my improvement. Fig. 2 is an end elevation. Fig. 3 is a section on line $x\,x$, Fig. 1. Fig. 4 is a detached central section of the housings. Fig. 5 is a perspective view of the blade-abutments. Fig. 6 is a perspective view of the socket-plate, in which one end of the shaft containing the blades is socketed.

A represents the frame of the machine, its upper portion forming a hopper, within which a reducing roll or cylinder B is mounted on an axle C, provided at its outer end outside of the frame A with a driving-pulley D, fly-wheel D', and loose pulley $D^2$. The periphery of the cylinder B is armed with hook-shaped ice-picks E. The upper portion of the hopper, formed by the side frames A, has an inclined front plate G for one wall and the armed cylinder forming the opposing abutment. This cylinder and wall G converge to a throat. The side walls or frames A are provided with eyes I I' and a socket-plate J, having a socket 2.

K represents a shaft from which extend radially three series of abutting blades $a$, $b$, and $c$, forming three separate lines, the blades of each set being differently spaced on said shaft.

3 represents the rounded end of the shaft, which is fitted into the eye I'.

4 represents the socket end of the shaft, to be fitted into the socket 2 of the socket-plate J.

The front wall G is provided with a series of parallel vertical slots $d$, through which the blades of the selected line of blades $a\,b\,c$ project into the throat of the breaker. These blades constitute the stationary abutments for supporting the cake of ice to the action of the moving ice-picks E on the cylinder B. The spaces between the blades of the series $a$ being different from the spaces between the blades of the series $b$ and also of the series $c$, it follows that the size of the pieces to which the ice will be reduced depends upon which one of the series of blades is fixed to project through the slots into the wall G. Of course the picks are set in the cylinder at such intervals as to pass between the said abutting blades. The shaft K may be either made detachable from the socket or, as shown, the socket-plate may be made detachable from the shaft, so that the shaft may be rotated to different positions and set, whereby different series of abutting blades are inserted into the throat of the machine. As shown, the socket-plate J is made detachable, it being detachably secured to one of the sides of the machine by means of thumb-screws 5 6, as shown in Fig. 3.

Provision for three different sizes of ice will be generally found sufficient; but the principle of the invention consists in providing a socket-plate with a polygonal-shaped socket and a shaft, one end of which has a similar-shaped socket and a provision of radial abutting blades on the shaft, this series being equal in number to the number of sides of the socket and the shaft and socket-plate being mutually detachable, whereby the shaft may be set in different positions, so that a differently-spaced series of abutting-blades may be inserted into the throat of the machine to determine the size pieces into which the ice is to be broken.

Having described my invention, I claim—

1. In an ice-breaker, a hopper, a revoluble reducing-roll therein, means for rotating the same, a shaft having two or more lines of radial blades differently spaced horizontally, means for supporting the said shaft in the hopper in a fixed position with any one of said lines of blades projecting toward the armed roll and forming a stationary abutment for the ice, substantially as described.

2. In an ice-breaker, a hopper, a revoluble reducing-roll therein, means for rotating the same, a shaft having two or more lines of blades radially projected therefrom, the blades being differently spaced horizontally on the different lines, one end of said shaft being socketed whereby the shaft may be supported in fixed position with any one of said horizontal lines of blades projecting into the hopper toward the reducing-roll forming an opposing abutment therefor, substantially as described.

3. In an ice-breaker, a hopper, a revoluble reducing-roll therein, means for rotating the same, a shaft having two or more lines of blades radially projecting therefrom, the blades being differently spaced horizontally on the different lines, one end of said shaft being polygonal-shaped, a socket-plate therefor on the frame of the machine, and means for detaching said shaft from its socket whereby the shaft may be fixed in different positions with any selected one of the lines of blades projecting into the hopper toward the reducing-roll forming a stationary abutment therefor, substantially as described.

4. In an ice-breaker, a hopper, a revoluble reducing-roll therein, means for rotating the same, a shaft having two or more lines of blades radially projecting therefrom, the blades being differently spaced horizontally on the different lines, means outside of said hopper for supporting said shaft in different fixed positions and slots formed in the casing of the hopper through which the said blades project toward the reducing-roll forming a fixed opposing abutment therefor, substantially as described.

5. In an ice-breaker, a hopper, a revoluble reducing-roll therein, means for rotating the same, a shaft having two or more lines of blades radially projecting therefrom, the blades being differently spaced horizontally on the different lines, means outside of said hopper for supporting said shaft, a socket end formed on said shaft, a socket-plate supported on the hopper-casing, and slots in the hopper-casing for the projection of said blades into the hopper, and means for detaching said shaft from said socket-plate, whereby the shaft may be fixed in different positions with any selected one of said lines of blades projecting through the slots and forming a stationary opposing abutment to the reducing-roll, substantially as described.

6. In an ice-breaker, a hopper, a revoluble reducing-roll therein, means for rotating the same, a shaft having two or more lines of blades radially projecting therefrom, the blades being differently spaced horizontally on the different lines, a journal for one end of said shaft in the hopper-casing outside of the hopper, the other end of said shaft being socket-shaped, a socket-plate detachably secured to the other side of the hopper-casing, and slots in the intermediate hopper-casing through which the blades of any selected one of said lines project into the hopper and toward the reducing-roll forming a stationary opposing abutment therefor, substantially as described.

In testimony whereof I have hereunto set my hand.

CHARLES HILBERT.

Witnesses:
OLIVER B. KAISER,
IDA J. LUCAS.